United States Patent [19]

Kirchmayer

[11] 4,301,786
[45] Nov. 24, 1981

[54] SOLAR COLLECTOR

[76] Inventor: Hermann Kirchmayer, Gabelsbergerstr. 77, D 8000 Munich 2, Fed. Rep. of Germany

[21] Appl. No.: 184,217

[22] Filed: Sep. 5, 1980

[30] Foreign Application Priority Data

Sep. 5, 1979 [DE] Fed. Rep. of Germany ....... 2935900

[51] Int. Cl.³ ............................................... F24J 3/02
[52] U.S. Cl. .................................... 126/417; 126/447; 126/450
[58] Field of Search ............... 126/417, 447, 448, 449, 126/450

[56] References Cited

U.S. PATENT DOCUMENTS

| 679,451 | 7/1901 | Baker | 126/448 |
|---|---|---|---|
| 3,366,168 | 1/1968 | Dale | 126/417 |
| 3,597,281 | 8/1971 | Webb | 126/417 |
| 4,011,856 | 3/1977 | Gallagher | 126/448 |
| 4,125,108 | 11/1978 | Porter et al. | 126/448 |
| 4,146,014 | 3/1979 | Allegro | 126/450 |
| 4,158,357 | 6/1979 | Allegro | 126/450 |
| 4,184,481 | 1/1980 | Tornquist | 126/450 |
| 4,202,319 | 5/1980 | Vinz | 126/417 |
| 4,210,128 | 7/1980 | Mattson | 126/450 |
| 4,211,213 | 7/1980 | Nissen | 126/449 |

Primary Examiner—Daniel J. O'Connor
Attorney, Agent, or Firm—Holman & Stern

[57] ABSTRACT

A solar collector for converting solar energy into heat, comprised of a multiplicity of collector elements which can be mounted on the outside of a building, which can be coupled to each other, and which can be connected to a heat transfer fluid system, each of said elements comprising a heat absorber with a channel in which a heat-carrying fluid circulates and a transparent cover which comprises two inclined surfaces at approximately a right angle to each other, with each of the two surfaces forming an acute angle with the base; characterized in that one of the two surfaces forms a steep angle with the base, on the order of about 60°, and the other of the two surfaces forms a shallow angle on the order of about 30°, with the base; and in that each of the two inclined surfaces is provided with its respective heat absorber having an identical inclination, and is provided with a channel; and further in that the channels of the two heat absorbers have mutually independent inlet and outlet tubes which are connectable to the heat transfer fluid system in a fashion depending on the given local installation of the collector.

6 Claims, 3 Drawing Figures

SOLAR COLLECTOR

BACKGROUND OF THE INVENTION

1. Field of the Invention

The invention concerns a solar collector for converting solar energy into heat, comprised of a multiplicity of collector elements which can be mounted on the outside of a building or the like, which can be coupled to each other, and which can be connected to a heat transfer fluid system, each of said elements comprising a heat absorber with a channel in which a heat-carrying (heat transfer) fluid circulates and a transparent cover which comprises two inclined surfaces at approximately a right angle to each other, with each of the two surfaces forming an acute angle with the base.

2. Description of the Prior Art

In a known solar collector of this type, which known collector is intended to be attached to vertical surfaces of a structure German laid open spec. OLS, the individual collector elements in their bottom area are in the form of heat absorbers with a channel formed by a continuous chamber, which channel in the mounted condition extends horizontally, and one end of said channel is the inlet tube for the heat transfer fluid and the other end is the outlet tube for said fluid, wherewith said channel is couplable to the corresponding channel of the adjacent collector element, which second channel lines up with it. The wider covering surfaces of the collector elements each form an angle of about 70° with the horizontal. The solar irradiation thus is incident on the covering surface, and particularly the heat absorber, at an angle which deviates more or less substantially from a right angle, so that the absorber surface is not optimally utilized. Use of the collector element is not suggested for every application, e.g. it is not suggested for a horizontal roof surface, because of even more unfavorable solarization conditions.

In another known solar collector German Utility Model, in which the two surfaces, which form an angle of about 90° with each other, form angles of about 45° with the base, the particular surface which is oriented toward the direction of incidence of the solar irradiation when the sun is high in the sky is furnished with a heat absorber. At the yearly average lower sun position this orientation is somewhat different from optimum. In return for this disadvantage one obtains the possibility of mounting the identical solar collector practically unchanged on the vertical walls of a structure, for collecting energy. But also in this case the most favorable conditions for collecting solar irradiation do not pertain.

The above-described customary solar collectors additionally have the disadvantage with regard to their structure and their operation that they cannot be effectively mounted on inclined surfaces, such as for example sloping roofs.

SUMMARY OF THE INVENTION

The underlying problem solved by the present invention was to further improve a solar collector of the type described initially supra so that it is universally usable, i.e., for horizontal surfaces, for example, as well as for shallowly sloping surfaces, without having to surrender optimum conditions of solarization.

The solar collector of the present invention which solves this problem is characterized essentially in that one of the two surfaces forms a steep angle with the base, on the order of about 60°, and the other of the two surfaces forms a shallow angle on the order of about 30° with the said base; and that each of the two inclined surfaces is provided with its own heat absorber having the identical inclination, and is provided with a channel; and further in that the channels of the two heat absorbers have mutually independent inlet and outlet tubes which are connectable to the heat transfer fluid system in a fashion depending on the given local installation of the collector. A solar collector of this type can be mounted on a flat roof such that the one surface inclined at about 60° faces the sun and is therefore subjected to optimum solarization. The same solar collector can be mounted also on a more or less gradually sloping roof with a southern exposure, namely in a manner such that the angle of the shallowly inclined surface on the collector adds to the angle of the roof, which latter angle is on the order of 30°. In this case one also obtains an optimum solarization angle, with maximum energy conversion. This type of solar collector is especially adapted for mass production, which is efficient and results in low production costs; this suitability for mass production is a consequence of the multiplicity of possible uses.

With regard to an easily mountable and manipulatable solar collector element, a further refining feature has proven to be especially advantageous whereby each collector element comprises multiple alternating surfaces, 2 to 5 or more, with the preferred number being three steeply inclined surfaces and three shallowly inclined surfaces; and whereby the inlet and outlet tubes of the channels of the steeply inclined surfaces, and also (independently) the inlet and outlet tubes of the channels of the shallowly inclined surfaces, are each interconnected in either series or parallel connection. Such a collector element is advantageous due to its comparatively flat structure, wherewith a reduction of the area under solarization does not have to be accepted in return for obtaining said flat structure.

When the solar collector of the present invention is mounted on a sloping roof, there exists the possibility that rain water will collect in the grooves which result between the narrow surfaces which form only a small angle with the horizontal and the wider surfaces located across them and subjected to the solarization to an optimum degree. In order to ensure trouble-free operation, it has been found very advantageous in a further refinement of the collector element according to the present invention, if within each collector element the longitudinal edges of the surfaces extend at an acute angle to the horizontal outer edge, which outer edge preferably is formed by the longitudinal edge of the collector element. Advantageously, each longitudinal edge of a surface has a bend point which is approximately in the middle of the respective collector element, whereby the arms thus formed include an obtuse angle between them.

Trouble-free outflow of water to both faces of each solar collector element is ensured if the respective surfaces have bend locations in the middle region of each collector element, and the segments thus formed include an obtuse angle.

BRIEF DESCRIPTION OF DRAWINGS

Further details, advantages, and features of the invention will be apparent from the following description and the drawings. Regarding the drawings, express reference is made to all details not described in the text.

DESCRIPTION OF THE PREFERRED EMBODIMENTS

Figure 1:
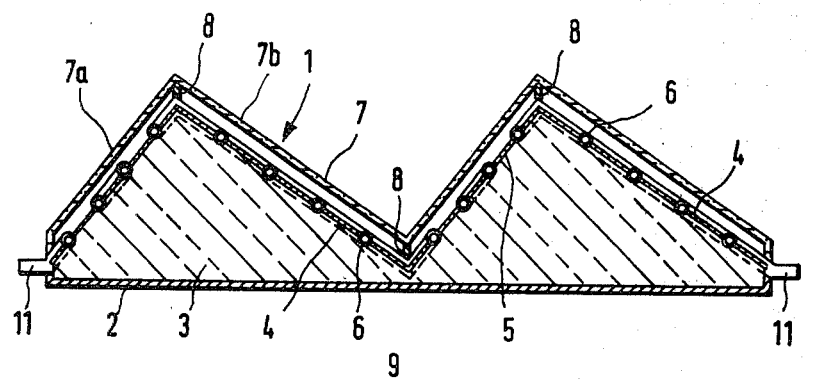
FIG. 1 is a cross sectional view of a collector element.

As is seen from the drawings, each collector element 1 comprises a corrosion-resistant or -proof housing 2 in which heat absorbers 4 and 5 each having a channel 6 are mounted above high-insulating-value insulation 3. The heat absorbers 4 and 5 may be made from, for example, aluminum sheet with good heat conduction, wherewith it is particularly advantageous to have a channel pressed into at least one of two aluminum sheets, with the channel 6 being formed when the one sheet is covered by the other. A correspondingly greater channel cross section is obtained if the second sheet is furnished with an configuration matching that of the first. A transparent cover 7 made of weather-resistant material such as thermoplastic poly(methyl methacrylate) type polymers is mounted at a distance from heat absorbers 4 and 5. It can be seen from FIG. 1 that the cover is divided into surfaces 7a and 7b which are sloped and form approximately a right angle with each other, with surface 7a forming a steep angle on the order of 60° with the base formed by the bottom of housing 2, and the other surface forming a small angle on the order of 30°. Likewise the heat absorbers 4 and 5 below surfaces 7a and 7b of cover 7 are sloped with respect to the base. The chambers between the cover surfaces and the heat absorbers are separated by cross panels, in order to prevent air circulation to the respective unirradiated, cold chambers. Plastic with suitable properties may be used in place of aluminum.

FIG. 1 shows an embodiment with two pairs of heat absorbers 4 and 5 oriented side by side, along with cover surfaces 7a and 7b. This enables the height of the longitudinal edges of the surfaces 7a and 7b, i.e. the distance from the base, to be kept relatively low, even with a choice of a collector element width of around 1.50 m. Further division results in further reduction of the height, which improves the application opportunities of collector elements of this type from an esthetic standpoint, particularly when they are mounted on inclined roof surfaces. This improvement is particularly experienced with a mounting of three or four pairs of heat absorbers set side by side, along with the cover surfaces.

Figure 2:
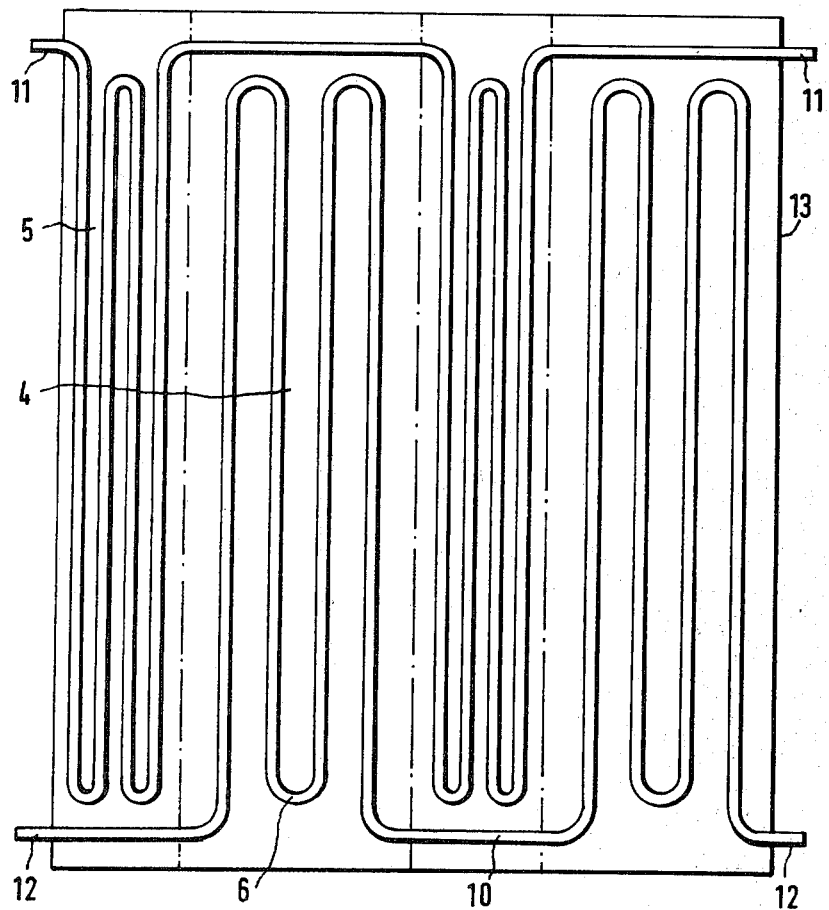
FIG. 2 is a schematic top view showing the channel paths in different absorbers.

It is seen from FIG. 2 that the channels 6 of the narrower absorbers 5 are connected by a connecting tube 9 provided on the rear end of collector element 1. Similarly, a connecting tube 10 is provided on the front end of collector element 1 for connecting the channels 6 of the absorbers 4 associated with the shallowly inclined cover surfaces 7b. The channels 6 of absorbers 4 have first feed and outlet tubes 11, and similarly the channels 6 of absorbers 5 have second feed and outlet tubes 12. Adjacent contact elements 1 may be coupled via the feed and outlet tubes 11 and 12. The feed and outlet tubes may also open out at the end face of contact elements 1 instead of on the side, which would vary from the configuration of FIG. 2 or alternatively be supplementary to it, the purpose of this being to connect such elements 1 in rows or lines.

The described contact elements 1 may be mounted on a horizontal surface, for example a flat roof, by means not illustrated here. With such horizontal mounting each of the 60° slope covers 7a and thus the narrower absorbers 5 are directed southward toward the sun. Only channels 6 of absorbers 5 are connected to the heat transfer fluid system. In the case where the contact elements 1 are attached to surfaces inclined at an angle in the neighborhood of 30°, for example on south-facing roofs, the contact elements 1 are mounted in an orientation which has been rotated around 180°. Their wider absorbers 4 are in this way exposed to the optimal solarization conditions, and only the channels 6 of these absorbers 4 are connected to the fluid system.

Figure 3:
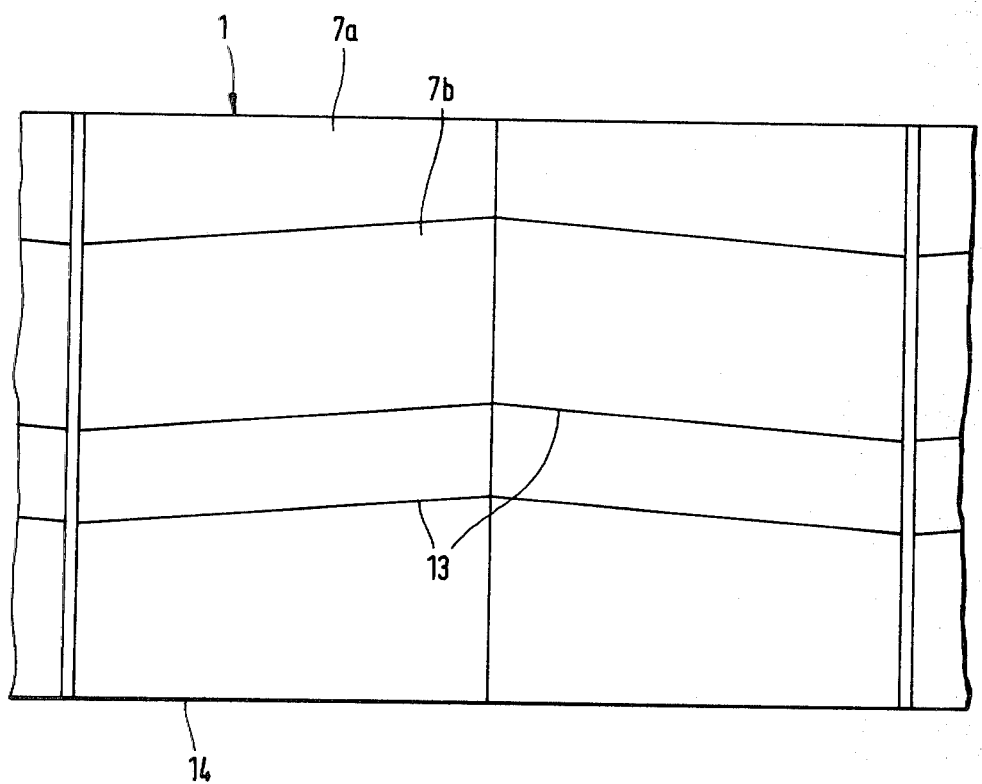
FIG. 3 is a schematic top view showing the sloping of the cover surfaces of the collector elements.

Mounting on sloping surfaces can lead to collection of rainwater in the troughs between the lower, narrower surfaces 7a and the wider surfaces 7b which adjoin these above. In order to promote the drainage of the rainwater, according to the variant illustrated in FIG. 3 the longitudinal edges 13 of surfaces 7a and 7b within each collector element 1 run at an acute angle to the horizontal outer edge, which outer edge ordinarily is made up of the longitudinal edge 14. In this connection, with a view toward satisfactory joining of successive contact elements 1 it is advantageous if, as in FIG. 3, each longitudinal surface edge 13 has a bend point in the middle of each contact element 1, whereby the arms thus formed include an obtuse angle between them.

With mounting on surfaces which are vertical, such as house walls, the wider surfaces 7b are oriented with an angle of inclination of 60°, while the narrower surfaces 7a are nearly perpendicular to the wall or are slightly downwardly inclined. This results in ideal perpendicular solarization, especially in the critical transition period in the early part of the year, and in the fall.

The channels 6 are applied to the surfaces 7a and 7b in such a way that the channels can be interconnected without crossing, as shown in FIG. 2. Feed and outlet tubes of the channels of a surface are on the same short side of the surface; and those of adjacent surfaces are on different short sides of the respective surfaces.

I claim:

1. A solar collector for converting solar energy into heat, comprised of a multiplicity of collector elements which can be mounted on the outside of a building, which can be coupled to each other, and which can be connected to a heat transfer fluid system, each of said elements comprising a heat absorber with a channel in which a heat-carrying fluid circulates and a transparent cover which comprises two inclined surfaces at approximately a right angle to each other, with each of the two surfaces forming an acute angle with the base; characterized in that one of the two surfaces forms a steep angle with the base, on the order of about 60°, and the other of the two surfaces forms a shallow angle on the order of about 30°, with the base; and in that each of the two inclined surfaces is provided with its respective heat absorber having an identical inclination, and is provided with a channel; and further in that the channels of the two heat absorbers have mutually independent inlet and outlet tubes which are connectable to the heat transfer fluid system in a fashion depending on the given local installation of the collector.

2. A solar collector according to claim 1; characterized in that each collector element has multiple alternating surfaces, comprising three steeply inclined surfaces and three shallowly inclined surfaces; and in that both the inlet and outlet tubes of the channels of the steeply inclined surfaces, and the inlet and outlet tubes of the channels of the shallowly inclined surfaces, are each interconnected.

3. A solar collector according to claim 2 wherein the inlet and outlet tubes of the steeply and shallowly inclined surfaces are interconnected in series.

4. A solar collector according to claim 2 wherein the inlet and outlet tubes of the steeply and shallowly inclined surfaces are interconnected in parallel.

5. A solar collector according to claims 1 or 3 or 4 characterized in that within each collector element the longitudinal edges of the surfaces extend at an acute angle to the horizontal outer edge, which outer edge is formed by the longitudinal edge of the collector element.

6. A solar collector according to claim 5 characterized in that each longitudinal edge of a surface has a bend point which is approximately in the middle of the respective collector element, whereby the arms thus formed include an obtuse angle between them.

* * * * *